June 1, 1948.  M. AUDIER  2,442,578
TIMING SYSTEM
Filed Dec. 27, 1946
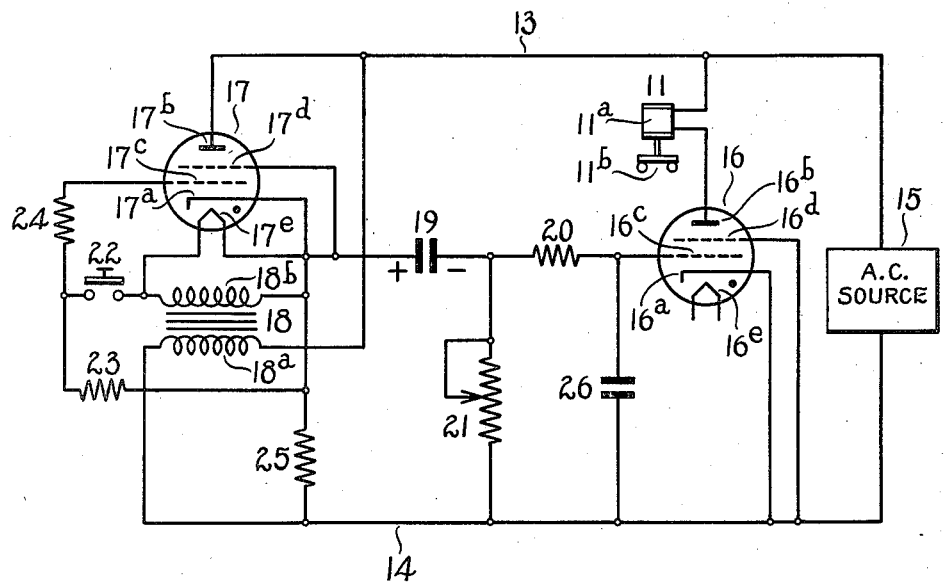
Inventor
Mark Audier
By Frank W. Hubbard
Attorney Patented June 1, 1948

2,442,578

UNITED STATES PATENT OFFICE 2,442,578

TIMING SYSTEM

Mark Audier, Milwaukee, Wis., assignor to Cutler-Hammer, Inc., Milwaukee, Wis., a corporation of Delaware Application December 27, 1946, Serial No. 718,810

6 Claims. (Cl. 315—252)

The invention relates to a synchronous timing system, and more particularly to a system affording on or off periods of current flow having a definite relation to the cyclic variations of an alternating voltage.

The invention has various advantageous applications including control of welding current impulses derived from an alternating current supply, it affording such impulses definite time phase relation to such alternating current.

An object of the invention is to provide a synchronous timer for alternating currents which always starts the timing cycle at the same moment of the alternating voltage cycle.

Another object is to provide for wide adjustment of the duration of the aforementioned timing cycle.

Another object is to provide a system which is simple in construction and requires few parts.

Another object is to provide a system which is positive and consistent in operation.

Other objects and advantages will hereinafter appear.

The drawing illustrates a system for the control of the energizing circuit of an electromagnetic relay in accordance with the invention.

A relay 11 is provided with an energizing winding 11a and normally closed contacts 11b, which may in turn be employed for the control of a translating circuit which it is desired to commutate in timed response to operation of an initiating device. One terminal of the energizing winding 11a is connected to one of the bus bars 13 of an alternating current supply line. The supply line has a second bus bar 14, the two bus bars being connected to a suitable alternating current source 15. The second terminal of the winding 11a is connected to the anode 16b of a gaseous electron tube 16. The tube 16 is also provided with a cathode 16a, control electrodes 16c and 16d, and a filament 16e for heating the cathode 16a. The filament may be connected to any suitable source of heating energy. The cathode 16a and the control electrode 16d are both connected to the bus bar 14. The potential of the control electrode 16c is in turn controlled by a second gaseous electron tube 17, which has a cathode 17a, an anode 17b, control electrodes 17c and 17d, respectively, and a heating filament 17e. The filament 17e is connected across the terminals of the secondary winding 18b of a transformer 18, which has also a primary winding 18a connected across the bus bars 13 and 14. The cathode 17a, the control electrode 17d, and one of the junctures of the filament 17e and the transformer winding 18b are jointly connected to one terminal of a capacitor 19, the other terminal of which is connected through a resistor 20 to the control electrode 16c and also through a variable high resistor 21 to the bus bar 14. The second juncture of transformer winding 18b and filament 17e is connected to one terminal of a control switch 22, the second terminal of which is connected to the first mentioned juncture through a resistor 23 and to the control electrode 17c through a resistor 24. The first mentioned juncture is further connected through the resistor 25, to the bus bar 14. The control electrode 16c is connected also to the bus bar 14 through a smoothing capacitor 26.

The system operates as follows: When the bus bars 13 and 14 are energized and the control switch 22 is open the control electrode 16c is substantially at the potential of the cathode 16a and the tube 16 becomes conducting during the half cycle of the voltage when the bus bar 13 is positive with respect to the bus bar 14. This energizes the coil 11a of the relay 11 so that the contacts 11b are opened upon energization of the system. At the same time the control electrode 17c of the tube 17 is substantially at the potential of the cathode 17a and the tube 17 also conducts current during the positive half cycle. While the tube 17 conducts current the voltage drop due to the said current which passes through the resistor 25, causes the cathode 17a and the plate of the capacitor 19 connected to the cathode to become positive with respect to the bus bar 14. This causes a flow of current in the resistor 21 which raises the potential of the control electrode 16c to a positive value with respect to the bus bar 14 so that the tube 16 continues to conduct.

If now the control switch 22 is closed the alternating voltage induced in the winding 18b, which is 180° out of phase with the main voltage between the bus bars 13 and 14, is impressed between the cathode 17a and the control electrode 17c during the positive half cycles of the bus bar voltage. If at the moment of closure of the switch 22 the tube 17 is already conducting (during a positive half cycle) it will continue to conduct current to the end of the respective half cycle. However, in the next succeeding half cycles the aforementioned alternating bias voltage prevents further conduction of the tube 17. Thus initiation of the timing period by said tube does not start until its current becomes zero.

When the tube 17 becomes nonconducting after closure of the switch 22, the voltage in resistor 25 due to the tube current disappears and the charge of the capacitor leaks off through the resistor 25. The capacitor 19 therefore discharges over the resistors 21 and 25, the rate of discharge being a function of the capacity of the capacitor 19 and the value of resistors 25 and 21. The flow of current from the condenser through the resistor 21 renders the condenser plate connected thereto and therefore also the control electrode 16c negative with respect to the cathode 16a, with the result that the tube 16 becomes nonconducting, thereby causing closure of the contacts 11b through deenergization of the winding 11a. As the capacitor discharges the discharge current through the resistor 21 decreases thereby again raising the potential of the control electrode 16c with respect to the cathode 16a until the negative potential of said control electrode is sufficiently low to again permit the tube 16 to conduct on the positive half cycle whereupon the contacts 11b are again opened as aforedescribed. Thereafter tube 16 remains conducting until the switch 22 is reopened and again reclosed which causes a repetition of the aforedescribed cycle. By adjustment of resistor 21 the rate of discharge of the capacitor 19 may be accurately controlled, thereby controlling the number of half cycles or even a fraction of a single half cycle during which the tube 16 is nonconducting.

It is of course also possible to employ an adjustable capacitor 19 for regulating the period of discharge or within limits to make the resistor 25 adjustable.

While the drawing shows the filament 17e connected across the transformer winding 18b to receive heating energy therefrom, it may obviously be separately connected to any suitable source of heating energy. It will also be obvious that the supplemental voltage which is impressed upon the control electrode 17c may be a direct current voltage of suitable magnitude in which case it replaces the winding 18b and the transformer 18 may be omitted.

The current impulse which deenergizes the coil 11a may also be used for other purposes. Thus the contacts 11b may be included in a circuit which supplies welding energy, whereby the duration of the flow of alternating current welding energy may be accurately preadjusted.

What I claim as new and desire to secure by Letters Patent is:

1. In combination, an alternating current source, a gaseous tube having a cathode and an anode respectively connected to a first terminal and a second terminal of said source and also having a control electrode, a resistor in said cathode connection, a capacitor having one of its plates connected to said cathode and its opposite plate connected to said first terminal of said source, a discharge resistor in the connection last mentioned, connections for said control electrode normally to subject it to substantially the potential of said cathode for current flow through said tube during alternate half cycles to charge said capacitor, means to subject said control electrode to a superposed potential such as to block repeated initiation of current flow through said tube, thereby providing for discharge of said capacitor through said resistors, and a second gaseous tube having a cathode connected to said first terminal and an anode connected to a different terminal of said source and having a control electrode connected to said opposite plate of said capacitor thereby to afford as a function of discharge of said capacitor a given condition of said second tube in definite time-phase relation to the alternating current of said source.

2. In combination, an alternating current source, a resistor, a first gaseous tube having a control electrode, a cathode connected through said resistor to one terminal of said source and an anode connected to the other terminal of said source, a capacitor having one plate connected to said cathode, a discharge resistor connected between the other plate of said capacitor and said one terminal, means to normally impress upon said control electrode substantially the potential of said cathode to afford current flow through said tube during alternate half cycles for charging said capacitor, means to superpose upon said control electrode a supplemental potential which prevents initiation of said current flow for permitting discharge of said capacitor through said resistors, and a second gaseous tube connected to said source and having a control electrode connected to said other plate of said capacitor to render said second tube normally conducting during said alternate half cycles and to render it temporarily nonconducting in response to the transient discharge voltage of said capacitor.

3. In combination, an alternating current source, a resistor, a first gaseous tube having a control electrode, a cathode connected through said resistor to one terminal of said source and an anode connected to the other terminal of said source, a capacitor having one plate connected to said cathode, a discharge resistor connected between the other plate of said capacitor and said one terminal, means to normally impress upon said control electrode substantially the potential of said cathode to afford initiation of current flow through said tube during alternate half cycles for charging said capacitor, means to superpose upon said control electrode a supplemental alternating potential which prevents initiation of said current flow for permitting discharge of said capacitor through said resistors, and a second gaseous tube connected to said source and having a control electrode connected to said other plate of said capacitor to render said second tube normally conducting during said alternate half cycles and to render it temporarily non-conducting in response to the transient discharge voltage of said capacitor.

4. In combination, an alternating current source, a resistor, a first gaseous tube having a control electrode, a cathode connected through said resistor to one terminal of said source and an anode connected to the other terminal of said source, a capacitor having one plate connected to said cathode, a discharge resistor connected between the other plate of said capacitor and said one terminal, means to normally impress upon said control electrode substantially the potential of said cathode to afford initiation of current flow through said tube during alternate half cycles for charging said capacitor, means to superpose upon said control electrode a supplemental potential which prevents initiation of said current flow for permitting discharge of said capacitor through said resistors, a translating device, a second gaseous tube connected in series with said device across the terminals of said source, said second tube having a control electrode, and means to impress the voltage across said discharge resistor upon the control electrode of said second tube to temporarily render said second tube non-conducting and deenergize said translating device in response to the transient discharge voltage of said capacitor.

5. In combination, an alternating current source, a resistor, a first gaseous tube having a control electrode, a cathode connected through said resistor to one terminal of said source and an anode connected to the other terminal of said source, a capacitor having one plate connected to said cathode, a discharge resistor connected between the other plate of said capacitor and said one terminal, a resistor interposed between said cathode and said control electrode to impress upon the latter the potential of said cathode to afford current flow through said tube during alternate half cycles for charging said capacitor, a source of supplemental potential, a normally open switch adapted when closed to impress said supplemental potential upon said control electrode to prevent initiation of said current flow for permitting discharge of said capacitor through said resistors, and a second gaseous tube connected to said source and having a control electrode connected to said other plate of said capacitor to normally render said second tube conducting during said alternate half cycles and to render it temporarily nonconducting in response to the transient discharge voltage of said capacitor.

6. In combination, an alternating current source, a resistor, a first gaseous tube having a control electrode, a cathode connected through said resistor to one terminal of said source and an anode connected to the other terminal of said source, a capacitor having one plate connected to said cathode, a discharge resistor connected between the other plate of said capacitor and said one terminal, a resistor interposed between said cathode and said control electrode to impress upon the latter the potential of said cathode to afford current flow through said tube during alternate half cycles for charging said capacitor, a transformer having a primary winding connected to the terminals of said source and a secondary winding having one terminal connected to said cathode, a normally open switch interposed between the second terminal of said secondary winding and said control electrode for impressing upon closure of said switch the potential of said secondary winding on said control electrode to prevent said current flow and permit discharge of said capacitor through said resistors, and a second gaseous tube connected to said source and having a control electrode connected to said other plate of said capacitor to normally render said second tube conducting during said alternate half cycles and to render it temporarily nonconducting in response to the transient discharge voltage of said capacitor.

MARK AUDIER.